(12) United States Patent
Xi et al.

(10) Patent No.: US 12,252,578 B2
(45) Date of Patent: Mar. 18, 2025

(54) POLYURETHANE FOAM COMPOSITION COMPRISING AN AROMATIC POLYESTER POLYOL COMPOUND AND PRODUCTS MADE THEREFROM

(71) Applicant: Huntsman International LLC, The Woodlands, TX (US)

(72) Inventors: Kai Xi, The Woodlands, TX (US); David J. Shieh, The Woodlands, TX (US); Lifeng Wu, The Woodlands, TX (US); Sachchida Singh, The Woodlands, TX (US)

(73) Assignee: HUNTSMAN INTERNATIONAL LLC

( * ) Notice: Subject to any disclaimer, the term of this patent is extended or adjusted under 35 U.S.C. 154(b) by 514 days.

(21) Appl. No.: 17/631,016

(22) PCT Filed: Aug. 5, 2020

(86) PCT No.: PCT/US2020/045014
§ 371 (c)(1),
(2) Date: Jan. 28, 2022

(87) PCT Pub. No.: WO2021/030115
PCT Pub. Date: Feb. 18, 2021

(65) Prior Publication Data
US 2022/0275144 A1    Sep. 1, 2022

Related U.S. Application Data

(60) Provisional application No. 62/884,842, filed on Aug. 9, 2019.

(51) Int. Cl.
| | |
|---|---|
| *C08G 18/60* | (2006.01) |
| *C08G 18/08* | (2006.01) |
| *C08G 18/42* | (2006.01) |
| *C08G 101/00* | (2006.01) |

(52) U.S. Cl.
CPC .......... *C08G 18/606* (2013.01); *C08G 18/14* (2013.01); *C08G 18/4219* (2013.01); *C08G 2101/00* (2013.01); *C08G 2110/0025* (2021.01); *C08G 2110/005* (2021.01); *C08G 2150/60* (2013.01)

(58) Field of Classification Search
CPC .......................... C08G 18/606; C08G 18/4219
See application file for complete search history.

(56) References Cited

U.S. PATENT DOCUMENTS

| 9,598,548 B2 | 3/2017 | Mueller-Cristadoro et al. |
| 2011/0237741 A1 | 9/2011 | Bleys et al. |

FOREIGN PATENT DOCUMENTS

| CN | 104628979 A | 5/2015 |
| WO | 2004/083274 A1 | 9/2004 |
| WO | 2018/132792 A1 | 7/2018 |
| WO | 2019/105935 A1 | 6/2019 |
| WO | 2021030117 A1 | 2/2021 |
| WO | 2021092100 A1 | 5/2021 |

OTHER PUBLICATIONS

Brazilian Preliminary Office Action issued Oct. 17, 2023, in corresponding Brazilian Application No. BR 11 2022 002266 2 (English translation enclosed herewith).
Chinese Office Action issued Sep. 27, 2023 in corresponding Chinese Application No. 202080060799.7.
International Search Report and Written Opinion received in corresponding PCT application PCT/US2020/045014 completed Oct. 19, 2020 and mailed Nov. 5, 2020.

*Primary Examiner* — Michael L Leonard
(74) *Attorney, Agent, or Firm* — HUNTSMAN INTERNATIONAL LLC; Lewis Craft

(57) ABSTRACT

A polyurethane foam composition comprising: (a) an isocyanate compound; (b) one or more isocyanate reactive compounds at least one of the isocyanate reactive compounds comprises an aromatic polyester polyol compound comprising an imide moiety wherein the aromatic polyester polyol is the reaction product of: (i) a cyclic anhydride compound; (ii) a phthalic acid based compound, (iii) a primary amine compound, (iv) an aliphatic diol compound; (v) optionally, a high functionality, low molecular weight polyether polyol compound; (vi) optionally, a hydrophobic compound; and wherein the weight ratio of Component (i) to Component (ii) is from 1:24 to 24:1; and wherein the aromatic polyester polyol is liquid at 25° C. and comprises a hydroxy value ranging from about 30 to about 600; and (c) a blowing agent.

10 Claims, 1 Drawing Sheet

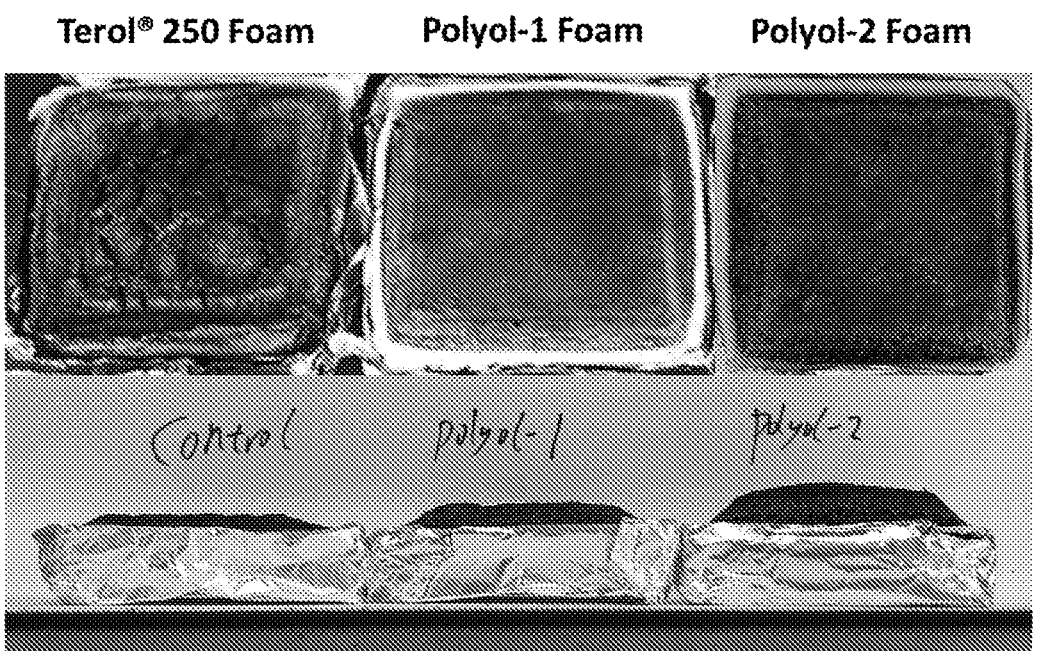

POLYURETHANE FOAM COMPOSITION COMPRISING AN AROMATIC POLYESTER POLYOL COMPOUND AND PRODUCTS MADE THEREFROM

CROSS-REFERENCE TO RELATED APPLICATIONS

This application is the National Phase of International Application PCT/US2020/045014 filed Aug. 5, 2020 which designated the U.S. and which claims priority to U.S. Provisional Application No. 62/884,842 filed Aug. 9, 2019. The noted applications are incorporated herein by reference.

BACKGROUND

Field

The present disclosure relates generally to a polyurethane foam composition comprising an aromatic polyester polyol compound and products made therefrom.

Background Information

Polyurethane ("PU") and polyisocyanurate ("PIR") based foam products are widely used in the building construction industry because of their superior sealing and insulative properties when compared to other building insulation solutions used in the industry.

Local building codes often dictate that materials used in the construction of a building, such as the PU and/or PIR based foam products, must pass certain flammability criteria before the products can be used in the construction of a building. Accordingly, formulators of these foam products often include fire retardant additives in the foam compositions to ensure that the final foam product passes the relevant building codes.

While use of a fire retardant additive in a foam composition is beneficial in most cases, there are inherent disadvantages with the use of such additives in the foam compositions. For example, use of a fire retardant additive can increase the overall cost of the composition thereby affecting the economic benefit of using PU and/or PIR foam product in the construction of a building. Additionally, adding fire retardant additives into a foam composition can cause storage and handling issues (e.g., uneven distribution or reactivity changes) that may deter a builder from using PU and/or PIR foam products in a building's construction.

BRIEF DESCRIPTION OF THE DRAWINGS

A full understanding of the disclosure can be gained from the following description of certain embodiments of the disclosure when read in conjunction with the accompanying drawings in which:

FIG. 1 is a photograph comparing three polyurethane foam products that were subjected to a fire test.

DETAILED DESCRIPTION

As used herein, unless otherwise expressly specified, all numbers such as those expressing values, ranges, amounts or percentages may be read as if prefaced by the word "about", even if the term does not expressly appear. Plural encompasses singular and vice versa.

As used herein, "plurality" means two or more while the term "number" means one or an integer greater than one.

As used herein, "includes" and like terms means "including without limitation."

When referring to any numerical range of values, such ranges are understood to include each number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "molecular weight" means weight average molecular weight ($M_w$) as determined by Gel Permeation Chromatography.

Unless otherwise stated herein, reference to any compounds shall also include any isomers (e.g., stereoisomers) of such compounds.

As used herein, "isocyanate index" or "NCO index" is the ratio of isocyanate groups over isocyanate reactive hydrogen atoms present in a composition given as a percentage:

$$\frac{[NCO] \times 100}{[\text{active hydrogen}]} (\%)$$

It should be noted that the NCO index expresses the percentage of isocyanate used in a composition with respect to the amount of isocyanate theoretically required for reacting with the amount of isocyanate-reactive hydrogen in the composition during the polymerization stage. Any isocyanate groups consumed in a preliminary step to produce a modified polyisocyanate compound (e.g. pre-polymer) or any active hydrogens consumed in a preliminary step (e.g., reacted with isocyanate to produce modified polyols or polyamines) are not considered in the calculation of the NCO index. Only the free isocyanate groups and the free isocyanate reactive hydrogens (including those of water, if used) present at the actual polymerization stage are considered in the calculation of the NCO index.

For purposes of calculating the NCO index, the expression "isocyanate reactive hydrogen atoms" refers to the total active hydrogen atoms in hydroxyl and amine functional groups present in the composition. In other words, at the polymerization stage, one hydroxyl group is deemed to comprise one reactive hydrogen; one primary amine group is deemed to comprise one reactive hydrogen; and one water molecule is deemed to comprise two active hydrogens.

As used herein, "liquid" means having a viscosity of less than 200 Pa·s. as measured according to ASTM D445-11a at 20° C.

As used herein, "trimerization catalyst" means a catalyst that catalyzes (promotes) the formation of isocyanurate groups from isocyanates.

Polyurethane/Polyisocyanurate Foam Composition

PU and PIR foam products are used in a variety of applications such as building construction, transportation, pipeline, shipbuilding, sporting goods, furniture, and packaging. The wide spread use of such foam products over numerous industries can be attributed to the fact that these products can be formulated to have a wide range of properties.

For example, in building construction applications, low density (e.g., 0.5-4 pcf) PU and PIR foams are used as insulation in sandwich or construction panels (e.g., panels used in roofs, walls, ceilings, and floors) or as spray-in-place foam because of their: (i) robust insulative/sealing performance; (ii) ability to meet or exceed building codes related to flamability and heat resistance/retardancy; and (iii) ability to enhance a structure's structrual integrity even if the structure is subjected to intense heat.

Similarly, low density (e.g., 1.5-4 pcf) PU and PIR foams are also used as insulation in transportation, pipeline, and shipbuilding applications. For example, these foam products are widely used in refrigerated vehicles, district heating systems (e.g., pipelines used to transport steam or hot water), and industrial pipelines or storage tanks used in the transport and storage of oil and other hydrocarbons.

In contrast to low density PU and PIR foams, high density PU and PIR foams are often used in non-insulative applications such as vehicular interior trim and headliners, office furniture, molded chair shells, simulated wood furnishing, and rigid molding.

As stated above, some PU and PIR foam compositions contain flame retardants to improve the overall flame retardant properties of the final foam product. However, there are inherent disadvantages with using a flame retardant additive in a foam composition. The polyurethane foam composition of the present disclosure, however, allows a formulator to reduce or possibly eliminate the need for using a flame retardant additive in a polyurethane composition while still maintaining the flammability properties exhibited by polyurethane compositions that use flame retardants.

The polyurethane foam composition disclosed herein comprises: (A) an isocyanate compound; (B) one or more isocyanate reactive compounds at least one of the isocyanate reactive compounds comprises an aromatic polyester polyol comprising an imide moiety wherein the aromatic polyester polyol is the reaction product of: (i) a cyclic anhydride compound comprising Structure (1), Structure (2), or combinations thereof; (ii) a phthalic acid based compound; a primary amine compound comprising Structure (3) (defined below); (iii) a primary amine compound; and (iv) an aliphatic diol; wherein the weight ratio of Component (i) to Component (ii) is from 1:24 to 24:1; and wherein the aromatic polyester polyol is liquid at 25° C. and comprises a hydroxy value ranging from 30 to 600; (C) a blowing agent; and (D) optionally, other additives.

Isocyanate Compound

The polyurethane foam composition disclosed herein comprises one or more isocyanate compounds. In some embodiments, the isocyanate compound is a polyisocyanate compound. Suitable polyisocyanate compounds that may be used include aliphatic, araliphatic, and/or aromatic polyisocyanates. The isocyanate compounds typically have the structure R—(NCO)$_x$ where x is at least 2 and R comprises an aromatic, aliphatic, or combined aromatic/aliphatic group. Non-limiting examples of suitable polyisocyanates include diphenylmethane diisocyanate ("MDI") type isocyanates (e.g., 2,4'-, 2,2'-, 4,4'-MDI or mixtures thereof), mixtures of MDI and oligomers thereof (e.g., polymeric MDI or "crude" MDI), and the reaction products of polyisocyanates with components containing isocyanate-reactive hydrogen atoms (e.g., polymeric polyisocyanates or prepolymers). Accordingly, suitable isocyanate compounds that may be used include SUPRASEC® DNR isocyanate, SUPRASEC® 2185 isocyanate, RUBINATE® M isocyanate, and RUBINATE® 1840 isocyanate, or combinations thereof. SUPRASEC® and RUBINATE® isocyanates are all available from Huntsman Corporation.

Other examples of suitable isocyanate compounds also include tolylene diisocyanate ("TDI") (e.g., 2,4 TDI, 2,6 TDI, or combinations thereof), hexamethylene diisocyanate ("HMDI" or "HDI"), isophorone diisocyanate ("IPDI"), butylene diisocyanate, trimethylhexamethylene diisocyanate, di(isocyanatocyclohexyl)methane (e.g. 4,4'-diisocyanatodicyclohexylmethane), isocyanatomethyl-1,8-octane diisocyanate, tetramethylxylene diisocyanate ("TMXDI"), 1,5-naphtalenediisocyanate ("NDI"), p-phenylenediisocyanate ("PPDI"), 1,4-cyclohexanediisocyanate ("CDI"), tolidine diisocyanate ("TODI"), or combinations thereof. Modified polyisocyanates containing isocyanurate, carbodiimide or uretonimine groups may also be employed as Component (1).

Blocked polyisocyanates can also be used as Component (1) provided that the reaction product has a deblocking temperature below the temperature at which Component (1) will be reacted with Component (2). Suitable blocked polyisocyanates can include the reaction product of: (a) a phenol or an oxime compound and a polyisocyanate, or (b) a polyisocyanate with an acid compound such as benzyl chloride, hydrochloric acid, thionyl chloride or combinations. In certain embodiments, the polyisocyanate may be blocked prior to introduction into the reactive ingredients/components used to in the composition disclosed herein.

Mixtures of isocyanates, for example, a mixture of TDI isomers (e.g., mixtures of 2,4- and 2,6-TDI isomers) or mixtures of di- and higher polyisocyanates produced by phosgenation of aniline/formaldehyde condensates may also be used as Component (1).

In some embodiments, the isocyanate compound is liquid at room temperature. A mixture of isocyanate compounds may be produced in accordance with any technique known in the art. The isomer content of the diphenyl-methane diisocyanate may be brought within the required ranges, if necessary, by techniques that are well known in the art. For example, one technique for changing isomer content is to add monomeric MDI (e.g., 2,4-MDI) to a mixture of MDI containing an amount of polymeric MDI (e.g., MDI comprising 30% to 80% w/w 4,4'-MDI and the remainder of the MDI comprising MDI oligomers and MDI homologues) that is higher than desired.

In some embodiments, the isocyanate compound comprises 30% to 65% (e.g., 33% to 62% or 35% to 60%) by weight of the total polyurethane foam composition.

Isocyanate Reactive Compound

The polyurethane foam composition disclosed herein comprises one or more isocyanate reactive compounds. As stated above, at least one of the isocyanate reactive compounds used in the polyurethane foam composition comprises an aromatic polyester polyol compound comprising an imide moiety ("Imide Moiety Containing Aromatic Polyol Compound"). Any of the known organic compounds containing at least two isocyanate reactive moieties per molecule may be employed as the other isocyanate reactive compound in the polyurethane foam composition ("Other Polyol Compound").

In some embodiments, the isocyanate reactive compound comprises 20% to 50% (e.g., 23% to 47% or 25% to 45%) by weight of the polyurethane foam composition.

Imide Moiety Containing Aromatic Polyol Compound

The Imide Moiety Containing Aromatic Polyol Compound used in the present disclosure is the reaction product of a composition comprising: (i) a cyclic anhydride compound; (ii) a phthalic acid based compound, (iii) a primary amine compound, (iv) an aliphatic diol; (v) optionally, a high functionality, low molecular weight polyether polyol compound; and (vi) optionally, a hydrophobic compound; wherein the weight ratio of Component (i) to Component (ii) is from 1:24 to 24:1 (collectively, the "Imide Moiety Polyol Composition"). A detailed description of the various reactive components used to form the Imide Moiety Containing Aromatic Polyol Compound can be found below.

In some embodiments, the Imide Moiety Containing Aromatic Polyol Compound is formed by mixing Components (i)-(vi) and allowing one or more of the reactive ingredients to react. In some embodiments, the Imide Moiety Containing Aromatic Polyol Compound is synthesized using a single-pot (i.e., one pot synthesis) and not a multi-pot process. For example, in certain embodiments, Components (i) to (iv) are placed in the same reaction vessel along with the optional reactive components (e.g., Components (v) and (vi)) and subjected to esterification/transesterification reaction conditions. Such reaction conditions, in certain embodiments, occur at a temperature ranging from 0° C. to 300° C. (e.g., 70° C. to 250° C.) for a time period ranging from 1 hour to 24 hours (e.g., 3 hours to 10 hours). In certain embodiments the Imide Moiety Containing Aromatic Polyol Compound may be pre-formed prior to being added to a reaction vessel with the optional reactive components described above. The Imide Moiety Containing Aromatic Polyol Compound and the optional reactive components are then subjected to esterification/transesterification reaction conditions.

In certain embodiments, an esterification/transesterification catalyst may be used to increase the reaction rate of the reactive components. Examples of suitable catalysts include tin catalysts (e.g., Fastcat™ (tin oxide-based) catalysts available from Arkema, Inc.), titanium catalysts (e.g., titanium catalysts include Tyzor® TBT (titanium tetra-n-butoxide) catalysts; Tyzor® TE (a triethanolamine titanate chelate) catalyst available from Dorf Ketal Specialty Catalysts), alkali catalysts (e.g., NaOH, KOH, sodium and potassium alkoxides), acid catalysts (e.g., sulfuric acid, phosphoric acid, hydrochloric acid, and sulfonic acid), enzymes, or combinations thereof. In some embodiments, the catalyst can be used in an amount ranging from 0.001 to 0.2 percent by weight based on the total weight of the Imide Moiety Polyol Composition.

One advantage of utilizing a single-pot synthesis process to form the Imide Moiety Containing Aromatic Polyol Compound is that such a process can be readily adopted in an industrial manufacture setting. For instance, use of a single-pot synthesis process not only reduces the overall capital expense and equipment needed to manufacture the Imide Moiety Containing Aromatic Polyol Compound but it also reduces the total amount of space needed to manufacture the Imide Moiety Containing Aromatic Polyol Compound.

It should be noted that in some embodiments, the Imide Moiety Polyol Composition is solvent-free. As used herein, "solvent-free" means that there are no solvents (e.g., acetone, tetrahydrofuran) present in the composition; provided, however, that in some instances that may be trace or incidental amounts of solvent (e.g., ≤5%, ≤3%, ≤1% by weight of the total Imide Moiety Polyol Composition) present in the composition.

It is noted that, in some embodiments, minor amounts of Component (iv) may be present after the formation of the Imide Moiety Containing Aromatic Polyol Compound. Accordingly, the composition may comprise up to 30 weight percent (e.g., 0% to 20% or 1% to 15%) of Component (iv) (i.e., unreacted free aliphatic diol) based on the total weight of the Imide Moiety Polyol Composition.

Component (i): Cyclic Anhydride Compound

Suitable cyclic anhydride compounds that may be used as Component (i) of the Imide Moiety Polyol Composition include one or more cyclic anhydride compounds comprising Structure (1), Structure (2), or combinations thereof:

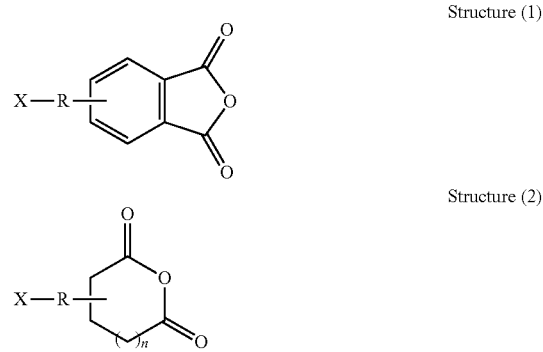

Structure (1)

Structure (2)

wherein X is a cyclic anhydride moiety, OH, or COOH, which attached directly to the structure or through R which is an aromatic ring, aliphatic ring, aliphatic chain radical each containing from 1 through 12 carbon atoms with or without alkyl branches, and with or without hetero atoms comprising, O, N, S etc. and n is an integer from 0 through 1.

Examples of suitable cyclic anhydrides that may be used as Component (i) include trimellitic anhydride, hemimellitic anhydride, pyromellitic dianhydride, mellophanic dianhydride, 3,3',4,4'-biphenyl tetracarboxylic dianhydride, 3-hydroxyphthalic anhydride, 4-hydroxyphthalic anhydride, bis (3,4-dicarboxyphenyl)ether dianhydride, 2,3,6,7-naphthalenetetracarboxylic dianhydride, cyclobutanetetracarboxylic dianhydride, carballylic anhydride, 3-hydroxynaphthalic anhydride, naphthalenetetracarboxylic anhydride, α-(2-carboxyethyl)glutaric anhydride.

In some embodiments, Component (i) comprises 1% to 68% (e.g., 3% to 20%) by weight based on the total weight of the Imide Moiety Polyol Composition.

Component (ii): Phthalic Acid based Compound

Examples of suitable phthalic acid based compounds that may be used as Component (ii) of the Imide Moiety Polyol Composition include one or more phthalic acid based compounds derived from: (a) substantially pure sources of the phthalic acid, such as phthalic anhydride, phthalic acid, isophthalic acid, terephthalic acid, 2,6-naphthalene dicarboxylic acid; methyl esters of phthalic, isophthalic, terephthalic acid, 2,6-naphthalene dicarboxylic acid; dimethyl terephthalate, polyethylene terephthalate, or combinations thereof; or (b) more complex ingredients such as the side stream, waste and/or scrap residues from the manufacture of phthalic acid, terephthalic acid, dimethyl terephthalate, polyethylene terephthalate, polybutylene terephthalate, polytrimethylene terephthalate, polyethylene naphthalate, or combinations thereof.

In some embodiments, Component (ii) comprises 1% to 70% (e.g., 1% to 50%, 2% to 40%) by weight based on the total weight of the Imide Moiety Polyol Composition. Moreover, in certain embodiments, the weight ratio of Component (i) to Component (ii) ranges from 1:24 to 24:1 (e.g., 1:19 to 9:1 or 1:20 to 4:1).

Component (iii): Primary Amine Compound

Suitable primary amine compounds that may be used as Component (iii) of the Imide Moiety Polyol Composition include a primary amine compound comprising Structure (3):

NH$_2$—R—X

Structure (3):

wherein X is —NH2, —OH or —COOH, and R is an aromatic ring, aliphatic ring, aliphatic chain radical each containing from 1 through 12 carbon atoms with or without alkyl branches, and with or without hetero atoms comprising, O, N, S, or combinations thereof.

Examples of suitable amines compounds that may be used as Component (iii) include diamines such as, ethylene diamine; 1,3 propane diamine; tetramethylene diamine; hexamethylene diamine; isophorone diamine; diaminodiphenylmethane; diaminodiphenylether; methylene-4 4'-cyclohexyl diamine; acetoguanamine; phenylene diamines, xylylene diamines; 1,2 cyclohexanediamine; 1,4 Cyclohexanediamine and mixtures thereof. Suitable amines can also include amino alcohols such as monoethanolamine; monopropanolamine, aminobenzylalcohol, aminophenylalcohol, hydroxyethylaniline and mixture thereof. Suitable amines can also include aminocarboxylic acids such as glycine; alanine, valine, aminopropionic acids, aminocaproic acid or amino benzoic acids and mixtures thereof.

In some embodiments, Component (iii) comprises 0.3% to 25% (e.g., 1% to 15%) by weight based on the total weight of the Imide Moiety Polyol Composition.

Component (iv): Aliphatic Diol Compound

Suitable aliphatic diol compounds that may be used as Component (iv) include an aliphatic diol compound comprising Structure (4):

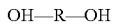  Structure (4):

wherein R is a divalent radical selected from the group comprising: (x) alkylene radicals comprising 2 to 12 carbon atoms, with or without alkyl branches; or (y) radicals of Structure (5):

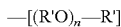  Structure (5):

wherein R' is an alkylene radical containing 2-4 carbon atoms and n is an integer from 1 to 10.

Examples of suitable aliphatic diol compounds that may be used as Component (iv) include ethylene glycol; diethylene glycol; propylene glycol; dipropylene glycol; trimethylene glycol; triethylene glycol; tetraethylene glycol; butylene glycols; 1,4 butanediol; neopentyl glycol; 2-methyl-2, 4-pentanediol; 1,6-hexanediol; 1,2-cyclohexanediol; poly (oxyalkylene)polyols each containing from two to four alkylene radicals derived by the condensation of ethylene oxide, propylene oxide, or combinations thereof.

In some embodiments, Component (iv) comprises 5% to 70% (e.g., 5% to 40%, 10% to 30%) by weight based on the total weight of the Imide Moiety Polyol Composition.

Component (v): High Functionality, Low Molecular Weight Polyether Polyols

The reactive mixture used to form the Imide Moiety Containing Aromatic Polyol Compound can also comprise a high functionality (i.e., three or more active hydrogen atoms per molecule), low molecular weight (i.e., up to 1,000 Daltons) polyether polyol compounds. Examples of suitable high functionality, low molecular weight polyether polyols include glycerin, alkoxylated glycerin, 1,1,1-trimethylolpropane, 1,1,1-trimethylolethane, pentaerythritol, dipentaerythritol, sucrose, alkoxylated sucrose, methyl glucoside, alkoxylated methyl glucoside, glucose, alkoxylated glucose, fructose, alkoxylated fructose, sorbitol, alkoxylated sorbitol, lactose, alkoxylated lactose, or combinations thereof.

In some embodiments, Component (v) comprises 0% to about 30% (e.g., 0% to 20%, 0% to 10%) by weight based on the total weight of the Imide Moiety Polyol Composition.

Component (vi): Hydrophobic Compound

The reactive mixture used to form the Imide Moiety Containing Aromatic Polyol Compound can also comprise a hydrophobic compound. As used herein, "hydrophobic compound" means a compound or mixture of compounds comprising one or more substantially non-polar organic moiety. The hydrophobic compound is generally water insoluble and typically contains at least one functional group capable of being esterified or trans-esterified (e.g., a monocarboxylic acid group, a monocarboxylic acid ester group, a hydroxyl group, or combinations thereof). As used herein, "monocarboxylic acid group" and "monocarboxylic acid ester group" means that the carboxylic acid moieties present in the hydrophobic compound are monoacids.

In some embodiments, the hydrophobic compounds used as Component (vi) are non-phthalic acid derived materials.

Suitable hydrophobic compounds that may be used as Component (vi) include carboxylic acids (e.g., fatty acid compounds such as caproic, caprylic, 2-ethylhexanoic, capric, lauric, myristic, palmitic, stearic, oleic, linoleic, linolenic, and ricinoleic), lower alkanol esters of carboxylic acids (e.g., fatty acid methyl esters compounds such as methyl caproate, methyl caprylate, methyl caprate, methyl laurate, methyl myristate, methyl palmitate, methyl oleate, methyl stearate, methyl linoleate, and methyl linolenate), fatty acid alkanolamides (e.g., tall oil fatty acid diethanolamide, lauric acid diethanolamide, and oleic acid monoethanolamide), triglycerides (e.g., fats and oils such as castor oil, coconut (including cochin) oil, corn oil, cottonseed oil, linseed oil, olive oil, palm oil, palm kernel oil, peanut oil, soybean oil, sunflower oil, tall oil, tallow, and derivatives of natural oil or functionalized, such as epoxidized, natural oil), alkyl alcohols (e.g., alcohols containing from 4 to 18 carbon atoms per molecule such as decyl alcohol, oleyl alcohol, cetyl alcohol, isodecyl alcohol, tridecyl alcohol, lauryl alcohol, and mixed $C_{12}$-$C_{14}$ alcohol), or combinations thereof.

In some embodiments, Component (vi) comprises 0% to 30% (e.g., 0% to 20%, 0% to 10%) by weight based on the total weight of the Imide Moiety Polyol Composition.

Emulsifiers

The Imide Moiety Containing Aromatic Polyol Compound composition can also contain nonionic emulsifier (i.e., compounds that contain one or more hydrophobic moieties and one or more hydrophilic moieties and which have no moieties that dissociate in aqueous solution or dispersion into cations and anions). While nearly any nonionic emulsifier compound can be employed, in some embodiments, the nonionic emulsifier can be a polyoxyalkylene emulsifier which contains an average of from about 4 to about 200 individual oxyalkylene groups per molecule with the oxyalkylene groups typically being selected from the group consisting of oxyethylene and oxypropylene. Typically, the nonionic emulsifier can comprise, for example, from about 0% to about 20% by weight of the composition (e.g., 0% to about 10%).

Imide Moiety Containing Polyol Compound Characteristics

In some embodiments, the Imide Moiety Containing Polyol Compound of the present disclosure has an average hydroxyl functionality ranging from 1.3 to 4 (e.g., 1.5 to 3.5 or 1.8 to 3).

In some embodiments, the Imide Moiety Containing Polyol Compound has an average hydroxyl number value ranging from 30 to 600 mg of KOH/g (e.g., 50 to 500 mg of KOH/g or 100 to 450 mg of KOH/g') while taking into account the free glycols that may be present.

In some embodiments, the Imide Moiety Containing Polyol Compound has an acid number ranging from 0.5 to 5 mg of KOH/g (e.g., 0.5 to 2 mg of KOH/g).

In some embodiments, the Imide Moiety Containing Polyol Compound has a viscosity ranging from 200 to 150,000 centipoises (cps) (e.g., 1,000 to 100,000 cps or 1,500 to 50,000) at 25° C. as measured using a Brookfield viscometer.

It was surprisingly found that in some embodiments the thermal stability of the Imide Moiety Containing Polyol Compound as measured at 500° C. under anaerobic conditions and at 400° C. under aerobic conditions is at least 5% higher than the thermal stability of Conventional Aromatic Polyester Polyol Compounds (wherein thermal stability is measured as TGA using the method described in the "Polyol Thermal Stability Testing" of the Examples below). As used herein, "Conventional Aromatic Polyester Polyol Compounds" are aromatic polyester polyol compounds having the same hydroxyl number as the Imide Moiety Containing Polyol Compound and which were prepared using the same reactive ingredients (except for Components (i) and (iii)) and under the same reactive conditions as the Imide Moiety Containing Polyol Compound. In other words, the Conventional Aromatic Polyester Compounds lack Components (i) and (iii).

While the Imide Moiety Containing Aromatic Polyol Compound is a reactive ingredient in a polyurethane foam composition disclosed, the Imide Moiety Containing Aromatic Polyol Compound can also be used as a polyol compound in any composition that uses a polyol. However, in certain embodiments of the present disclosure, the Imide Moiety Containing Aromatic Polyol Compound is not used in coating applications. In other words, the Imide Moiety Containing Aromatic Polyol Compound is not used in a coating composition such as a paint composition.

Other Polyol Compound

As stated above, the polyurethane foam composition disclosed herein can also comprise Other Polyol Compounds in addition to the Imide Moiety Containing Aromatic Polyol Compound described in the preceding sections. Polyol compounds or mixtures thereof that are liquid at 25° C., have a molecular weight ranging from 60 to 10,000 (e.g., 300 to 10,000 or less than 5,000), a nominal hydroxyl functionality of at least 2, and a hydroxyl equivalent weight of 30 to 2000 (e.g., 30 to 1,500 or 30 to 800) can be used as the Other Polyol Compound.

Examples of suitable polyols that may be used as the Other Polyol Compound include polyether polyols, such as those made by addition of alkylene oxides to initiators, containing from 2 to 8 active hydrogen atoms per molecule. In some embodiments, the initiators include glycols, glycerol, trimethylolpropane, triethanolamine, pentaerythritol, sorbitol, sucrose, ethylenediamine, ethanolamine, diethanolamine, aniline, toluenediamines (e.g., 2,4 and 2,6 toluenediamines), polymethylene polyphenylene polyamines, N-alkylphenylene-diamines, o-chloro-aniline, p-aminoaniline, diaminonaphthalene, or combinations thereof. Suitable alkylene oxides that may be used to form the polyether polyols include ethylene oxide, propylene oxide, and butylene oxide, or combinations thereof.

Other suitable polyol compounds that may be used as the Other Polyol Compound include Mannich polyols having a nominal hydroxyl functionality of at least 2, and having at least one secondary or tertiary amine nitrogen atom per molecule. In some embodiments, Mannich polyols are the condensates of an aromatic compound, an aldehyde, and an alkanol amine. For example, a Mannich condensate may be produced by the condensation of either or both of phenol and an alkylphenol with formaldehyde and one or more of monoethanolamine, diethanolamine, and diisopronolamine. In some embodiments, the Mannich condensates comprise the reaction products of phenol or nonylphenol with formaldehyde and diethanolamine. The Mannich condensates of the present disclosure may be made by any known process. In some embodiments, the Mannich condensates serve as initiators for alkoxylation. Any alkylene oxide (e.g., those alkylene oxides mentioned above) may be used for alkoxylating one or more Mannich condensates. When polymerization is completed, the Mannich polyol comprises primary hydroxyl groups and/or secondary hydroxyl groups bound to aliphatic carbon atoms.

In certain embodiments, the polyols that are used are polyether polyols that comprise propylene oxide ("PO"), ethylene oxide ("EO"), or a combination of PO and EO groups or moieties in the polymeric structure of the polyols. These PO and EO units may be arranged randomly or in block sections throughout the polymeric structure. In certain embodiments, the EO content of the polyol ranges from 0 to 100% by weight based on the total weight of the polyol (e.g., 50% to 100% by weight). In some embodiments, the PO content of the polyol ranges from 100 to 0% by weight based on the total weight of the polyol (e.g., 100% to 50% by weight). Accordingly, in some embodiments, the EO content of a polyol can range from 99% to 33% by weight of the polyol while the PO content ranges from 1% to 67% by weight of the polyol. Moreover, in some embodiments, the EO and/or PO units can either be located terminally on the polymeric structure of the polyol or within the interior sections of the polymeric backbone structure of the polyol. Suitable polyether polyols include poly(oxyethylene oxypropylene) diols and triols obtained by the sequential addition of propylene and ethylene oxides to di- or trifunctional initiators that are known in the art. In certain embodiments, Other Polyol Compound comprises the diols or triols described above or, alternatively, mixtures thereof.

The polyether polyols also include the reaction products obtained by the polymerization of ethylene oxide with another cyclic oxide (e.g., propylene oxide) in the presence of polyfunctional initiators such as water and low molecular weight polyols. Suitable low molecular weight polyols include ethylene glycol, propylene glycol, diethylene glycol, dipropylene glycol, cyclohexane dimethanol, resorcinol, bisphenol A, glycerol, trimethylolopropane, 1,2,6-hexantriol, pentaerythritol, or combinations thereof.

Polyester polyols that can be used as the Other Polyol Compound include polyesters having a linear polymeric structure and a number average molecular weight (Mn) ranging from about 500 to about 10,000 (e.g., preferably from about 700 to about 5,000 or 700 to about 4,000) and an acid number generally less than 1.3 (e.g., less than 0.8). The molecular weight is determined by assay of the terminal functional groups and is related to the number average molecular weight. The polyester polymers can be produced using techniques known in the art such as: (1) an esterification reaction of one or more glycols with one or more dicarboxylic acids or anhydrides; or (2) a transesterification reaction (i.e. the reaction of one or more glycols with esters of dicarboxylic acids). Mole ratios generally greater than one mole of glycol to acid are preferred to obtain linear polymeric chains having terminal hydroxyl groups. Suitable polyester polyols also include various lactones that are typically made from caprolactone and a bifunctional initiator such as diethylene glycol. The dicarboxylic acids of the desired polyester can be aliphatic, cycloaliphatic, aromatic, or combinations thereof. Suitable dicarboxylic acids which can be used alone or in mixtures generally have a total of from 4 to 15 carbon atoms include succinic, glutaric, adipic, pimelic, suberic, azelaic, sebacic, dodecanedioic, isophthalic, terephthalic, cyclohexane dicarboxylic, or combinations thereof. Anhydrides of the dicarboxylic acids (e.g., phthalic anhydride, tetrahydrophthalic anhydride, or combinations thereof) can also be used. In some embodiments, adipic acid is the preferred acid. The glycols used to form suitable polyester polyols can include aliphatic and aromatic glycols having a total of from 2 to 12 carbon atoms. Examples of such glycols include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, or combinations thereof.

Additional examples of suitable polyols include hydroxyl-terminated polythioethers, polyamides, polyesteramides, polycarbonates, polyacetals, polyolefins, polysiloxanes, and simple glycols such as ethylene glycol, butanediols, diethylene glycol, triethylene glycol, the propylene glycols, dipropylene glycol, tripropylene glycol, and mixtures thereof.

Additional examples of suitable polyols include those derived from a natural source, such as plant oil, fish oil, lard, and tallow oil. Plant based polyols may be made from any plant oil or oil blends containing sites of unsaturation, including, but not limited to, soybean oil, castor oil, palm oil, canola oil, linseed oil, rapeseed oil, sunflower oil, safflower oil, olive oil, peanut oil, sesame seed oil, cotton seed oil, walnut oil, and tung oil.

The active hydrogen-containing material may contain other isocyanate reactive material such as polyamines and polythiols. Suitable polyamines include primary and secondary amine-terminated polyethers, aromatic diamines such as diethyltoluene diamine and the like, aromatic polyamines, or combinations thereof.

Blowing Agent Compounds

As stated above, the polyurethane foam composition disclosed herein also comprises a blowing agent compound. Any physical blowing agent known in the art of PU and PIR foams can be used in the composition disclosed herein. For example, suitable blowing agent compounds include hydrocarbons, hydrochlorofluorocarbons, hydrofluorocarbons, hydrohaloolefins, or combinations thereof.

Examples of hydrocarbon blowing agents that may be used include lower aliphatic or cyclic, linear, or branched hydrocarbons (e.g., alkanes, alkenes and cycloalkanes, preferably those compounds having from 4 to 8 carbon atoms). Specific examples of suitable blowing agent compounds include n-butane, iso-butane, 2,3-dimethylbutane, cyclobutane, n-pentane, iso-pentane, technical grade pentane mixtures, cyclopentane, methylcyclopentane, neopentane, n-hexane, iso-hexane, n-heptane, iso-heptane, cyclohexane, methylcyclohexane, 1-pentene, 2-methylbutene, 3-methylbutene, 1-hexene, or combinations thereof.

Examples of suitable hydrochlorofluorocarbons include 1-chloro-1,2-difluoroethane, 1-chloro-2,2-difluoroethane, 1-chloro-1,1-difluoroethane, 1,1-dichloro-1-fluoroethane, monochlorodifluoromethane, or combinations thereof.

Examples of suitable hydrofluorocarbons include 1,1,1,2-tetrafluoroethane (HFC 134a), 1,1,2,2-tetrafluoroethane, trifluoromethane, heptafluoropropane, 1,1,1-trifluoroethane, 1,1,2-trifluoroethane, 1,1,1,2,2-pentafluoropropane, 1,1,1,3-tetrafluoropropane, 1,1,1,3,3-pentafluoropropane (HFC 245fa), 1,1,3,3-pentafluoropropane, 1,1,1,3,3-pentafluoro-n-butane (HFC 365mfc), 1,1,1,4,4,4-hexafluoro-n-butane, 1,1,1,2,3,3,3-heptafluoropropane (HFC 227ea), or combinations thereof.

Examples of suitable hydrohaloolefins are trans-l-chloro-3,3,3-fluoropropene (HFO 1233zd), trans-l,3,3,3-tetrafluoropropene (HFO 1234ze), cis- and trans-1,1,1,4,4,4-hexafluoro-2-butene (HFO 1336mzz), or combinations thereof.

Other suitable physical blowing agents are tertiary butanol (2-methyl-2-propanol), dimethoxymethane and methyl formate.

Chemical blowing agents, such as water, mono-carboxylic acid, and polycarboxylic acid (e.g., formic acid), can also be used as the sole blowing agent in the polyurethane foam composition disclosed herein. Alternatively, these chemical blowing agents can also be used in combination with the physical blowing agents described above as a co-blowing agent.

In some embodiments, the blowing agent compounds are used in an amount sufficient to give the final foam product the desired density of less than 20 lb/cu.ft (e.g., ≤10 lb/cu. Ft. or ≤4 lb/cu. ft.).

Auxiliary Compounds and Additives

The polyurethane foam composition disclosed herein can also comprise one or more auxiliary compounds or additives that can be added to impart certain physical properties to the final foam product formed from the polyurethane foam composition. Examples of suitable auxiliary compounds and additives include catalysts, surfactants, fire retardants, smoke suppressants, cross-linking agents (e.g., triethanolamines and/or glycerol), viscosity reducers (e.g., propylene carbonate and/or dibasic esters), infra-red pacifiers (e.g., carbon black, titanium dioxide, and metal flakes), cell-size reducing compounds (e.g., insert, insoluble fluorinated compounds and perfluorinated compounds), pigments (e.g., azo-/diazo dyestuff and phthalocyanines), fillers (e.g., calcium carbonate), reinforcing agents (e.g., glass fibers and/or grounded foam waste), mold release agents (e.g. zinc stearate), anti-oxidants (e.g., butylated hydroxy toluene), dyes, anti-static agents, biocide agents, or combinations thereof.

Catalyst compounds that can accelerate/promote: (P) the reaction between the isocyanate compounds and the isocyanate reactive compounds; or (I) formation of isocyanurates (e.g., the reaction between isocyanate compounds) may be used in the polyurethane foam composition of the present disclosure. Suitable catalysts include urethane catalysts (e.g., tertiary amine catalysts), blowing catalysts, trimerization catalysts, or combinations thereof. Examples of such catalysts include dimethylcyclohexylamine, triethylamine, pentamethylenediethylenetriamine, tris (dimethylaminopropyl) hexahydrotriazine, dimethylbenzylamine, bis-(2-dimethylaminoethyl)-ether, dimethylethanolamine, 2-(2-dimethylamino-ethoxy)-ethanol; organometallic compounds such as potassium octoate, potassium acetate, dibutyltin dilaurate, dibutlytin diacetate, bismuth neodecanoate, 1,1',1",1'''-(1,2-ethanediyldinitrilo)tetrakis[2-propanol] neodecanoate complexes, 2,2',2",2'''-(1,2-ethanediyldinitrilo)tetrakis[ethanol] neodecanoate complexes, quaternary ammonium salts such as 2-hydroxypropyl trimethylammonium formate, or combinations thereof.

In some embodiments, the catalyst compounds can be used in an amount up to 5% (e.g., 0.5% to 3%) by weight of the polyurethane foam composition.

Foam formulators typically use surfactants in their foam compositions to control the cell structure of the final foam product. Accordingly, various surfactants (e.g., silicone and/or non-silicone based surfactants) may be used in the polyurethane foam composition of the present disclosure. Examples of suitable surfactants include: (i) silicone surfactants including: (a) L-5345, L-5440, L-6100, L-6642, L-6900, L-6942, L-6884, L-6972; Evonik Industries DC-193, DC5357, Si3102, Si3103 (each available from Momentive Performance Materials Inc.); (b) Tegostab 8490, 8496, 8536, 84205, 84210, 84501, 84701, 84715 (each available from Evonik Industries AG), polyorganosiloxane polyether copolymers (e.g., polysiloxane polyoxyalkylene block co-polymers); (ii) non-silicone surfactants including non-ionic, anionic, cationic, ampholytic, semi-polar, and zwitterionic organic surfactants; (iii) non-ionic surfactants including: phenol alkoxylates (e.g., ethoxylated phenol compounds), alkylphenol alkoxylates (e.g., ethoxylated nonylphenol compounds), LK-443 (available from Evonik Industries AG), Vorasurf 504 (available from Dow Chemical Co), (iv) or combinations thereof.

In some embodiments, the surfactants can be used in an amount up to 5% (e.g., 0.5% to 3%) by weight of the polyurethane foam composition.

While one of the primary goals of the present disclosure is to provide a polyurethane foam composition that contains little to no fire retardants, these compounds can still be used in the polyurethane foam composition of the present disclosure. Examples of suitable flame retardants that may be used include: (i) organo-phosphorous compounds such as organic phosphates, phosphites, phosphonates, polyphosphates, polyphosphites, polyphosphonates, ammonium polyphosphates, triethyl phosphate, tris(2-chloropropyl)-phosphate, diethyl ethyl phosphonate, diethyl hydroxymethylphosphonate; dialkyl hydroxymethylphosphonate, Diethyl N,N bis (2-hydroxyethyl)aminomethylphosphonate; (ii) halogenated fire retardants (e.g., tetrabromophthalate diol and chlorinated parrafin compounds); or (iii) combinations thereof.

In some embodiments, the fire retardants can be used in an amount up to 15% (e.g., up to 10%) by weight of the polyurethane foam composition.

Polyurethane/Polyisocyanurate Foam Product

A PU and/or PIR foam product is formed from the polyurethane foam composition of the present disclosure. In certain embodiments, a PU and/or PIR foam can be formed from the polyurethane foam composition disclosed herein by introducing the following components of the polyurethane foam composition with one another and allowing the reactive components to react: (1) an isocyanate compound; (2) one or more isocyanate reactive compounds (including the Imide Moiety Containing Polyol Compound); (3) a blowing agent; and (4) additional additives. To form a PU foam product, the molar ratio of the isocyanate compound to the one or more isocyanate reactive compounds is near 1:1 (e.g., usually less than 2:1) while the molar ratio of the isocyanate compound to the one or more isocyanate reactive compound is greater than 1:1 (e.g., 2:1) when forming a PIR foam product.

The materials described above can be used as Components 1, 2, 3, or 4. The components can be introduced to one another in multiple streams (i.e., at least two streams). In some embodiments, one stream comprises the isocyanate compound while the other stream comprises the one or more isocyanate reactive compounds. In certain embodiments, the stream comprising the isocyanate reactive compounds can also comprise other materials (e.g., auxiliary additives/compounds) so long as they are not reactive toward the isocyanate reactive compounds. It is noted that the stream comprising the isocyanate compound can also comprise other materials (e.g., auxiliary additives/compounds) provided that the materials are not reactive toward the isocyanate compound. In some embodiments, the blowing agent is introduced in a third stream that is separate and distinct from the streams that comprise the isocyanate compound and the isocyanate reactive compounds. While the auxiliary additives/compounds may be introduced in one or more of the streams, the auxiliary additives may also be introduced in one or more additional streams (e.g., a catalyst stream) that is separate and distinct from the streams described above if desired.

Mixing of the streams may be carried out either in a spray apparatus (e.g., spray gun), a mix head (including those with or without a static mixer), or some other type of vessel that is configured to spray or otherwise deposit the components of the polyurethane foam composition disclosed herein onto a substrate.

In some embodiments, the isocyanate compound and the one or more isocyanate reactive compounds of the polyurethane foam composition are reacted at an NCO index of up to 1000%. In some embodiments, the NCO index ranges from 20% to 180% (e.g., 40% to 160%). For urethane-modified polyisocyanurate foams, the NCO index is typically higher (e.g., from 180% to 1000% or 200% to 500% or 250% to 500%).

The PU and/or PIR foam products may be closed-cell or open-cell. As used herein, a foam shall be deemed to be a "closed-cell" foam if the closed cell content of the foam is greater than 70% (e.g., ≥80% or ≥85%) as measured by ASTM D6226-15. It shall be deemed to be "open-celled" when the closed cell content of such foam is less than 50% (e.g., ≤40% or ≤30%) as measured by ASTM D6226-15.

In some embodiments, the PU and/or PIR foam products exhibit a thermal conductivity value (K-value) ranging from 0.10 to 0.17 Btu-in/hr·ft$^{2\circ}$ F. (e.g., 0.11 to 0.16 Btu-in/hr·ft$^{2\circ}$ F. or 0.12 to 0.15 Btu-in/hr·ft$^{2\circ}$ F.) as measured by ASTM C518-17 at average plate temperature of 75° F.

In certain embodiments, the PU and/or PIR foam products have an ASTM E1354-17 performance that is better than a comparative foam made from the same composition where the imide-containing aromatic polyester polyol is replaced by imide-free aromatic polyester polyol wherein the weight ratio of component (i) to component (ii) is 0:100.

In other embodiments, the PU and/or PIR foam products have an ASTM E1354-17 performance that is equal to a comparative foam made from the same composition where the imide-containing aromatic polyester polyol is replaced by imide-free aromatic polyester polyol d wherein the weight ratio of component (i) to component (ii) is 0:100; and wherein the polyurethane foam uses less flame retardant than the comparative foam.

Use of Polyurethane Foam Composition

The polyurethane foam composition disclosed herein can be used in applications requiring high heat/thermal resistance (e.g., ≥121.1° C.), heat distortion, flammability resistance, and/or char integrity. The PU and/or PIR foam product made from the polyurethane foam composition disclosed herein may be produced in a form that is well known to those skilled in art of polyurethanes. For example, suitable forms include slabstock, moldings, cavity filling (e.g., pour-in-place foam), spray-in-place foam, frothed foam, or laminate (e.g., foam product combined with another material such as paper, metal, plastics or wood-board).

Construction and Other Industrial Applications

In the United States of America, model building codes require that materials used in commercial/residential buildings and homes meet certain fire performance criteria depending whether the material will be used in roofs, walls, ceilings, attics, or crawl spaces. The criteria are measured by fire test including ASTM E84, E108, E119, E662, E2074; FM 4450, 4880; NFPA 285, 286; and UL 1040, 1256. The PUR and PIR foam produced from the polyurethane foam composition disclosed herein can be used to meet one or more of the fire tests described above while significantly reducing or eliminating the use of fire retardants.

While the polyurethane foam composition disclosed herein can be applied onto various types of substrates, in some embodiments, the substrate is a rigid or flexible facing sheet made of foil or another material (including another layer of similar or dissimilar polyurethane) which is being conveyed (continuously or discontinuously) along a production line by means such as a conveyor belt. In certain embodiments, the facing sheet is used to manufacture building panels that are used in the construction industry.

In another embodiment, the polyurethane foam composition disclosed herein is used in the continuous production of PU or PIR based metal panels. In this application, the polyurethane foam composition is applied via one or more mix heads to a lower metal layer (which can be profiled) in a double band laminator. In some embodiments, the line speed of the laminator is set at a speed of 75 ft/min or less. In the laminator, a continuously formed metal panel is made when the rising foam composition reaches the upper surfacing layer. The formed metal panel is then cut to a desired length at the exit end of the laminator. Suitable metals that may be used in this application include aluminum or steel which can be coated with a polyester or epoxy layer to help reduce the formation of rust while also promoting adhesion of the foam to the metal layer. In some embodiments, the final foam metal panel comprises a foam thickness ranging from 1 inch to 8 inches.

In another embodiment, the polyurethane foam composition disclosed herein is used in the continuous production of PU and/or PIR foam laminate insulation board and cover board, generically referred to as boardstock. In this process, the foaming mixture is applied via one or more mix heads to the lower facer layer in a double band laminator. In some embodiments, the line speed of the laminator is set at a speed of 300 ft/min or less. In the laminator, a continuously formed board is made when the rising foam mixture reaches the upper facer layer. Like the metal panels described above, the boards are then cut to a desired length at the exit end of the laminator. Suitable materials that may be used in the facer include aluminum foil, cellulosic fibers, reinforced cellulosic fibers, craft paper, coated glass fiber mats, uncoated glass fiber mats, chopped glass, or combinations thereof. In some embodiments, the final foam laminate board has a foam thickness ranging from 0.25 inches to 5 inches.

It is noted that in the examples described above, the upper facer layer may be applied on top of the deposited composition either before or after the polyurethane foam composition is partially or fully cured.

In alternative embodiment, the polyurethane foam composition disclosed herein can be poured into an open mold (including being distributed via laydown equipment into an open mold) or simply deposited at or into a desired location (i.e., a pour-in-place application) such as between the interior and exterior walls of a structure. In general, such applications may be accomplished using the known one-shot, prepolymer or semi-prepolymer techniques used in combination with conventional mixing methods. Upon reacting, the polyurethane foam composition will take the shape of the mold or adhere to the substrate onto which it is deposited. The polyurethane foam composition is then allowed to either fully or partially cure in place.

In certain embodiments, the polyurethane composition can be injected into a closed mold thereby forming a molded polyurethane foam product. In these applications, the polyurethane composition can be injected with or without vacuum assistance.

If a mold is employed (irrespective of whether it is an open or closed mold), then the mold can be heated to facilitate the handling and workability of the polyurethane composition (e.g., facilitate flow of the polyurethane foam composition in the mold).

Pipe Line Applications

To achieve desired heat/thermal and flammability resistance requirements, the polyurethane foam composition disclosed herein can be used in pipeline applications (e.g., pipelines used in the transport of oil, bitumen, natural gas, petroleum, hot water, or steam (both pressurized and non-pressurized)). For example, the polyurethane foam composition disclosed herein can be used in the production of pre-insulated pipes in the European Union for use in district heating. The European Union requires that such pipes meet or exceed the DIN EN-253 standard which requires the pipe assembly to have a life expectancy of at least thirty (30) years at a continuous operating temperature of 120° C.

In piping applications, the polyurethane foam composition disclosed herein can be introduce discontinuously into the hollow space between a pipe (e.g. metal pipe made from steel) and an outer sheathing (e.g., a plastic sheathing made from polyethylene) thereby forming an insulated pipe. Alternatively, the polyurethane foam composition can be applied continuously to a pipe around which the sheathing layer is subsequently laid either before or after the polyurethane foam composition has fully cured thereby forming an insulated pipe.

Spray Foam

The polyurethane foam composition disclosed herein can be applied onto a substrate using a proportioning system or some other mean of spraying. The proportioning system, which may be a fixed ratio system, comprises a resin composition supply vessel, an isocyanate component supply vessel, a spray machine, and a spray gun comprising a mixing chamber. The composition comprising the isocyanate reactive compounds (e.g., the Imide Moiety Containing Aromatic Polyol Compound), blowing agent, and other auxiliary additives (collectively, "Resin Composition") is pumped in a first stream from the resin composition supply vessel to the spray machine. The isocyanate compound is pumped in a second stream, which is separate and distinct from the Resin Composition, from the isocyanate component supply vessel to the spray machine. The isocyanate component and Resin Composition are heated and pressurized in the spray machine and supplied to the spray gun in two separate heated hoses to form the polyurethane foam composition. The polyurethane composition is then provided to the spray gun, which is used to: (i) mix the isocyanate compound and the Resin Composition and (ii) spray the polyurethane composition onto the substrate.

Suitable substrates that can be sprayed with the polyurethane foam composition include sheathing materials (e.g., oriented strand board (OSB), plywood, gypsum sheetrock, foam board, fiberboard and cellulosic sheathing); wood, concrete, polyvinyl chloride, metal, or combinations thereof. In certain embodiments, the PU and/or PIR foam product may be formed in-situ over regular or irregular surfaces (e.g., on commercial and residential wall, ceiling, floor or other substrates) of a structure.

In some embodiments, a spray-in-place foam made the polyurethane foam composition disclosed herein may achieve Class I rating in ASTM E84 without using the use of a fire retardant such as tris(1-chloro-2-propyl)phosphate (TCPP).

Modifications

While specific embodiments of the present disclosure have been described in detail, it will be appreciated by those skilled in the art that various modifications and alternatives to those details could be developed considering the overall teachings of the disclosure. Accordingly, the arrangements disclosed are meant to be illustrative only and not limiting as to the scope of the disclosure which is to be given the full breadth of the claims appended and all equivalents thereof. Therefore, any of the features, properties, and/or elements which are listed above may be combined with one another in any combination and still be within the breadth of this disclosure.

EXAMPLES

Raw Material and Components:
The following reaction components, raw material and terms are referred to in the examples:

PTA: Purified terephthalic acid (available from Grupo Petrotemex, S.A. de C.V.).

DEG: Diethylene glycol (available from Equistar Chemicals, LP).

TEG: Triethylene glycol available from (Dow Chemical Company).

PEG 200: Polyethylene glycol 200 (available from Huntsman International LLC).

Glycerin (available from Terra Biochem LLC).

TYZOR® TE: Titanium (triethanolaminato)isopropoxide solution 80 wt. % in isopropanol (available from Dorf Ketal Specialty Catalysts LLC).

TMA: Trimellitic anhydride (1,2,4-Benzenetricarboxylic anhydride from Sigma Aldrich Corporation).

Glycine (available from Sigma Aldrich Corporation).

MDA: 4,4'-Diaminodiphenylmethane (available from Sigma Aldrich Corporation).

TEROL® 250: Aromatic polyester polyol having an OH value of 250 mg KOH/g (available from Huntsman International LLC).

JEFFOL® R-470X: A reactive aromatic amine polyol having an OH value of 470 mg KOH/g (available from Huntsman International LLC).

JEFFCAT® H-1: A gel-blow balanced polyurethane amine catalyst (available from Huntsman International LLC).

Pel-Cat 9540-A: A solution of potassium 2-ethylhexanoate in diethylene glycol (available from Ele Corporation).

DC193: A silicone surfactant (available from Evonik Industries AG as DABCO® DC193 Surfactant).

BICAT 8210: Bismuth 2-ethylhexanoate (available from The Shepherd Chemical Company).

TCPP: Tris(2-chloroisopropyl) phosphate (available from Lanxess Corporation as LEVAGARD® PP).

SOLSTICE® LBA: 1-Chloro-3,3,3-trifluoropropene (available from Honeywell International Inc.).

RUBINATE® M: Polymeric MDI having an NCO value of 30.5% (available from Huntsman International LLC).

Analysis and Testing:
The following terms are referred to in the examples:

Acid Value: A measurement of residue acid in polyester polyol determined by standard titration techniques, e.g. ASTM D4662.

OH Value: Hydroxyl value which is a measurement of the number of OH groups determined by standard titration techniques, e.g. ASTM D4274.

Viscosity: Viscosity measured using a Brookfield Viscometer, such as a Brookfield DV-II Viscometer.

TGA analysis: Thermogravimetric analysis (TGA) was run using TGA Q5000 from TA instruments-Water LLC. It is a method of thermal analysis in which the mass of a sample is measured over time as the temperature changes.

Cream time: the elapsed time between the moment a composition's isocyanate component is mixed with the composition's isocyanate reactive component and the formation of the fine froth or cream in the composition Gel time: the elapsed time between the moment a composition's isocyanate component is mixed with the composition's isocyanate reactive component and the point at which the expanded foam begins to gel due to crosslinking. Experimentally, such gel is determined when a 6" wooden tongue depressor (e.g., Puritan 705) is pushed underneath the rising foam surface and a string is formed when pulling it out.

Tack free time: the elapsed time between the moment a composition's isocyanate component is mixed with the composition's isocyanate reactive component and the point at which the outer skin of the foam loses its stickiness or adhesive quality. Experimentally, such loss of stickiness is when a 6" wooden tongue depressor (e.g., Puritan 705) is brought into contact with the surface of the reaction mixture and appears non-sticky when it is removed from the surface.

FRD (Free rise density): the density of a foam sample taken from the center of a cup foam Tg (Glass transition temperature): the temperature at which an amorphous material transit from a hard and relatively brittle "glassy" state into a viscous or rubbery state.

Cone calorimeter test: The test was conducted in accordance with the test method ASTM E1354-17 at a radiant heat intensity of 30 kW/m$^2$. The following parameters were recorded:

PHRR: Peak heat release rate, the highest rate of heat generation by fire.

THR: The total heat generated by fire at a certain time.

TSR: The total smoke generated by fire at a certain time.

ML %: Percentage of mass loss at a certain time during the fire.

Description of Polyol Synthesis

Polyol-1:
286 g of PTA, 73 g of trimellitic anhydride (TMA), 38 g of MDA, 11 g of glycerin, 73 g of PEG 200, 194 g of TEG, and 197 g of DEG was added to a 500 mL cylindrical glass reactor. Under a 0.3-0.5 liter per minute (LPM) flow of nitrogen, the reaction mixture was heated to 80° C. and maintained at that temperature for 30 minutes. The mixture was then heated to 140° C. and maintained at that temperature for 30 minutes before being heated to 246° C. The temperature was then maintained at 246° C. and the condensation water was collected. When the head temperature dropped below 70° C. (~2 hours later), 0.8 g of Tyzor TE was added. The reaction was then heated at 240° C. until the acid value was below 2.0 mg KOH/g (~3 hours). The reaction was cooled to below 100° C. and Polyol-1 was collected. The OH value was measured and then DEG was added to adjust the OH value to the calculated 250 mg KOH/g while blending at 80° C. for 30 minutes. The polyol was then cooled to room temperature, and the final OH value and viscosity were measured.

Polyol-2:

273 g of PTA, 79 g of trimellitic anhydride (TMA), 31 g of glycine, 11 g of glycerin, 76 g of PEG 200, 202 g of TEG, and 205 g of DEG was added to a 500 mL cylindrical glass reactor. Under a 0.3-0.5 liter per minute (LPM) flow of nitrogen, the reaction mixture was heated to 80° C. and maintained at that temperature for 30 minutes. The mixture was then heated to 140° C. and maintained at that temperature for 30 minutes before being heated to 246° C. The temperature was maintained at 246° C. and the condensation water was collected. When the head temperature dropped below 70° C. (~3 hours later), 0.8 g of Tyzor TE was added. The reaction was then heated at 240° C. until the acid value is below 2.0 mg KOH/g (~5 hours). The reaction was cooled to below 100° C. and the Polyol-2 was collected. The OH value was measured and then DEG was added to adjust the OH value to the calculated 250 mg KOH/g while blending at 80° C. for 30 minutes. The polyol was then cooled to room temperature, and the final OH value and viscosity were measured.

Summary of the Polyol Properties:

TABLE 1

| Polyol | Acid Value (mg KOH/g) | OH Value (mg KOH/g) | Viscosity (cPs) | TMA to PTA weight ratio |
|---|---|---|---|---|
| Terol ® 250 | 1.2 | 250 | 5,560 | 0 |
| Polyol-1 | 1.1 | 253 | 15,090 | 0.255 |
| Polyol-2 | 1.3 | 250 | 8,060 | 0.29 |

Polyol Thermal Stability Testing:

The thermal stability of the inventive Polyol-1, Polyol-2 and the comparative TEROL® 250 polyol was evaluated using TGA under nitrogen and air respectively. TGA is a widely accepted analytical method that provide an indication of relative thermal stability for the material under consideration. All polyols were heated from 25° C. to 700° C. with a temperature raise rate of 10° C./min. Percent retention of foam weight at a given temperature relative to the foam's initial weight at 25° C. is summarized in Tables 2 and 3 below. As expected, in all cases, the greater the temperature, the greater the extent of polyol decomposition, and the lower the percent retention. The inventive Polyol-1 and Polyol-2 showed higher weight retention at all temperatures compared to the comparative TEROL® 250 polyol in both anaerobic and aerobic conditions. Higher weight retention at a given temperature in TGA suggests better thermal stability for Polyol-1 (wherein the ratio of TMA to PTA is 0.29) and Polyol-2 (wherein the ratio of TMA to PTA is 0.255) when compared to TEROL® 250 (wherein the ratio of TMA to PTA was zero).

TABLE 2

| | Weight % under nitrogen | | |
|---|---|---|---|
| Temp(° C.) | Terol ® 250 | Polyol-1 | Polyol-2 |
| 350 | 66.96 | 72.38 | 71.33 |
| 400 | 46.82 | 62.93 | 60.16 |
| 450 | 4.41 | 20.66 | 14.76 |
| 500 | 2.73 | 16.71 | 11.39 |
| 550 | 2.45 | 15.93 | 10.41 |
| 600 | 2.18 | 14.67 | 9.08 |

TABLE 3

| | Weight % under air | | |
|---|---|---|---|
| Temp(° C.) | Terol ® 250 | Polyol-1 | Polyol-2 |
| 350 | 33.53 | 64.98 | 60.34 |
| 400 | 18.21 | 48.64 | 41.87 |
| 450 | 5.61 | 21.89 | 14.08 |
| 500 | 3.09 | 16.36 | 9.10 |
| 550 | 0.10 | 4.78 | 0.67 |
| 600 | 0.03 | 0.03 | 0.14 |

Description of Making Polyurethane Cup Foams

The composition of two foam formulations (i.e., Formulation-1 & Formulation-2) are listed in Table 4. Formulation 1 represents a polyurethane foam system containing a flame retardant (TCPP) whereas Formulation 2 does not contain any TCPP. The isocyanate to polyol pre-mix ratio is 1.10 for Formulation 1 and 1.15 for Formulation 2 so that both formulations have the same isocyanate index 169. The foam used for thermal stability and fire properties tests were made by the following steps: (i) pouring the contents of the A-Side and B-Side into a 32-oz non-waxed paper cup (e.g., Solo H4325-2050) thereby combining the two components so the total weight of A-side and B-side is between 110 gram and 120 gram; (ii) mixing the combined components for ~4 to 5 seconds at 2500-3000 rpm using a mechanical mixer (e.g., Caframo BDC3030 stirrer); (iii) allowing the components of the composition to react thereby forming the polyurethane foam product, and recording the reactivities (Cream time, Gel time, Tack free time); (iv) store the foam at room temperature and humidity for 24 hours; and (v) cut a 4 cm×4 cm×4 cm sample from about 6 cm under the foam top surface to measure the free rise density (FRD). Reactivities and FRDs are summarized in Table 5.

TABLE 4

| Formulations | Formulation-1 | Formulation-2 |
|---|---|---|
| Polyol Premix | | |
| Polyester Polyol | 53.5 | 53.5 |
| Jeffol R-470 | 13.4 | 13.4 |
| DC 193 | 1.0 | 1.0 |
| Pel-Cat 9540-A | 0.6 | 0.6 |
| JEFFCAT ® H-1 | 0.3 | 0.3 |
| BICAT 8210 | 0.1 | 0.1 |
| Water | 1.0 | 0.5 |
| TCPP | 15.6 | |
| Solstice ® LBA | 14.5 | 15.0 |
| Total Polyol Premix | 100.0 | 84.4 |

TABLE 4-continued

| Formulations | Formulation-1 | Formulation-2 |
|---|---|---|
| Isocyanate | | |
| Rubinate M | 110.0 | 97.1 |
| Isocyanate/Premix ratio | 1.10 | 1.15 |
| Isocyanate Index | 169 | 169 |

Description of the Foam Thermal Stability and Fire Property Tests:

Measurement of the Glass Transition Temperature (Tg): A piece of foam was taken from the center location above the cup rim height. It was tested under compression mode by an RSA-G2 solid analyzer from TA Instruments. The direction of compression mode was aligned with the foam rise direction. A temperature scan was performed with a frequency of 1 Hz and a dynamic strain within viscoelastic linear region. After the temperature scan procedure was completed, the temperature at the peak of the tan delta was selected as the Tg (summarized in Table 5). Polyurethane foams exhibiting higher glass transition temperature can maintain better physical properties, such as foam strength, under elevated temperature.

Cone calorimeter Test: A 10 cm×10 cm×2.5 cm sample was cut from about 3 cm under the top surface of a cup foam and test the fire property on a cone calorimeter. Table 5 summarizes the data of PHRR as well as THR, TSR and ML % (all at 2 minutes). In cone calorimeter test, lower PHRR and lower THR indicate lower fuel contribution by the material being tested to fire and thus better fire properties. Lower TSR indicate lower smoke generation by the material being tested, again an indicator of better fire properties. Lower ML % suggest higher amount of original material retained after exposure to the radiant heat. Lower ML % for a foam is also an indicator for better fire properties.

FIG. 1 shows the residue left behind after the cone calorimeter fire test of foams made using Formulation 1. The residue from foams made using inventive Polyol-1 and Polyol-2 showed monolithic and intumescent charring as compared to foam made using comparative TEROL® 250 polyol. Monolithic charring is advantageous as it indicates that foam is likely to maintain its structural integrity upon burning in a fire better than one that shows lot of cracking/splitting. Intumescent char can slow down heat transfer from the exposed side to the unexposed side of an assembly better than regular char.

TABLE 5

| | Formulation 1 | | | Formulation 2 | | |
|---|---|---|---|---|---|---|
| Polyol | Terol ® 250 | Polyol-1 | Polyol-2 | Terol ® 250 | Polyol-1 | Polyol-2 |
| Cream Time (s) | 9 | 9 | 8 | 6 | 6 | 6 |
| Gel Time (s) | 27 | 28 | 27 | 15 | 14 | 17 |
| Tack Free Time (s) | 47 | 44 | 39 | 21 | 19 | 24 |
| FRD (pcf) | 2.25 | 2.18 | 2.16 | 2.22 | 2.15 | 2.13 |
| Tg (° C.) | 133 | 147 | 135 | 159 | 173 | 155 |
| PHRR (kW/m$^2$) | 87.7 | 73.1 | 76.5 | 122.5 | 101.6 | 112.5 |
| THR (MJ/m$^2$) | 2.49 | 1.67 | 1.18 | 6.86 | 3.71 | 2.27 |
| TSR (m$^2$/m$^2$) | 80.6 | 55.0 | 58.2 | 134.3 | 96.5 | 85.4 |
| ML% (%) | 21.7 | 17.2 | 15.7 | 38.4 | 22.3 | 17.1 |

Foam Thermal Stability Test using TGA: The thermal stability of the foams made with the inventive Polyol-1, Polyol-2, and comparative TEROL® 250 was evaluated using TGA under nitrogen. TGA analysis in anaerobic condition under elevated temperature can simulate the degradation of polyurethane foam which will produce gaseous fuel to the fire. The first test used the same ramping method as in polyol stability test with temperature rising from 25° C. to 700° C. with a temperature raise rate of 10° C./min. The second test quickly raised the temperature from 25° C. to 550° C. with a temperature raise rate of 100° C./min followed by isothermic at 550° C. for 60 mins. The results are summarized in Tables 6 and 7 below. Foams made with the inventive polyols showed higher mass retention than control foams at a given temperature in both tests which suggested a slower and less thermal degradation.

TABLE 6

TGA Result Using Slow Ramping Method, Weight % Under Nitrogen

| Temp | Formulation 1 | | | Formulation 2 | | |
|---|---|---|---|---|---|---|
| (° C.) | Terol ® 250 | Polyol-1 | Polyol-2 | Terol ® 250 | Polyol-1 | Polyol-2 |
| 100 | 99.67 | 99.59 | 99.44 | 99.82 | 99.68 | 99.46 |
| 150 | 96.83 | 97.07 | 96.35 | 98.26 | 98.6 | 97.91 |
| 200 | 90.15 | 89.69 | 88.38 | 94.78 | 94.92 | 94.08 |
| 250 | 85.67 | 84.79 | 83.62 | 91.31 | 90.88 | 90.14 |
| 300 | 75.36 | 73.92 | 71.95 | 79.58 | 78.42 | 77.09 |
| 350 | 55.82 | 56.82 | 55.57 | 59.62 | 61.72 | 60.34 |
| 400 | 47.67 | 48.75 | 48.57 | 50.05 | 53.23 | 52.39 |
| 450 | 41.86 | 41.94 | 41.88 | 43.15 | 46.4 | 45.67 |
| 500 | 37.06 | 36.91 | 36.49 | 37.99 | 41.56 | 40.46 |
| 550 | 32.89 | 33.12 | 32.68 | 34.1 | 38.06 | 36.28 |
| 600 | 29.71 | 29.91 | 29.45 | 30.57 | 33.88 | 32.65 |
| 650 | 28.53 | 28.67 | 28.24 | 29.17 | 32.4 | 31.26 |

TABLE 7

TGA Result Using Isthermic Method, Weight % Under Nitrogen

| Time | Temp | Formulation 1 | | | Formulation 2 | | |
|---|---|---|---|---|---|---|---|
| (min) | (° C.) | Terol ® 250 | Polyol-1 | Polyol-2 | Terol ® 250 | Polyol-1 | Polyol-2 |
| 0 | 25 | 99.29 | 99.52 | 99.44 | 99.39 | 99.26 | 99.31 |
| 1 | 124 | 98.36 | 99.45 | 99.25 | 99.68 | 99.59 | 99.46 |
| 2 | 224 | 89.82 | 90.2 | 89.55 | 95.55 | 95.93 | 95.33 |
| 3 | 321 | 78.37 | 76.82 | 75.42 | 83.13 | 81.86 | 81.33 |
| 4 | 423 | 47.83 | 46.75 | 47.17 | 52.22 | 51.65 | 51.83 |
| 5 | 522 | 33.26 | 33.63 | 33.87 | 35.67 | 36.93 | 37.41 |
| 8 | 550 | 24.14 | 27.18 | 27.29 | 26.32 | 29.34 | 30.00 |
| 10 | 550 | 23.15 | 26.45 | 26.54 | 25.40 | 28.33 | 28.94 |
| 20 | 550 | 21.68 | 25.3 | 25.31 | 24.03 | 26.81 | 27.29 |
| 30 | 550 | 21.29 | 24.86 | 24.9 | 23.63 | 26.4 | 26.92 |
| 40 | 550 | 21.11 | 24.57 | 24.67 | 23.41 | 26.18 | 26.72 |
| 50 | 550 | 20.99 | 24.32 | 24.49 | 23.24 | 26.03 | 26.58 |
| 60 | 550 | 20.92 | 24.13 | 24.34 | 23.12 | 25.92 | 26.47 |

It should also be noted that the foam products made from the compositions had internal excellent appearance (e.g., uniform internal cell size and free of internal voids) and had fine internal cells with no evidence of cell collapse. In other words, good quality foam product was produced using the compositions disclosed herein.

What is claimed is:

1. A polyurethane foam composition comprising:
   an isocyanate compound;
   one or more isocyanate reactive compounds at least one of the isocyanate reactive compounds comprises an aromatic polyester polyol compound comprising an imide moiety wherein the aromatic polyester polyol is the reaction product of:
   (i) a cyclic anhydride compound comprising Structure (1), Structure (2), or combinations thereof;

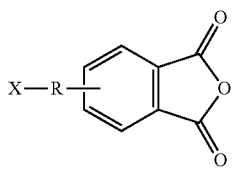

Structure (1)

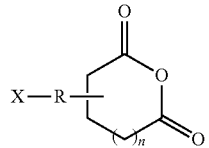

Structure (2)

wherein X is a cyclic anhydride moiety, OH, or COOH, which is attached directly to the structure or through R which is an aromatic ring, aliphatic ring, aliphatic chain radical each containing from 1 through 12 carbon atoms with or without alkyl branches, and with or without hetero atoms comprising, O, N, and/or S and n is an integer from 0 through 1;
   (ii) a phthalic acid based compound,
   (iii) a primary amine compound,
   (iv) an aliphatic diol compound;
   (v) optionally, a high functionality, low molecular weight polyether polyol compound;
   (vi) optionally, a hydrophobic compound; and
   wherein the weight ratio of Component (i) to Component (ii) is from 1:24 to 24:1; and wherein the aromatic polyester polyol is liquid at 25° C. and comprises a hydroxy value ranging from about 30 to about 600; and
   a blowing agent.

2. The polyurethane foam composition according to claim 1, wherein the viscosity of the aromatic polyester polyol compound comprising an imide moiety ranges from about 200 to about 150,000 centipoises at 25° C.

3. The polyurethane foam composition according to claim 1, wherein the acid value of the aromatic polyester polyol compound comprising an imide moiety ranges from about 0.1 mg of KOH/g to about 10 mg of KOH/g.

4. The polyurethane foam composition according to claim 1, wherein the aromatic polyester polyol compound comprising an imide moiety does not comprise a solvent.

5. The polyurethane foam according to claim 1, wherein the polyurethane foam is applied to a surface of a roofing, wall, pipe, or storage tank assembly.

6. A method of forming a polyurethane foam product comprising:
   reacting, in the presence of a blowing agent, a reactive mixture comprising an isocyanate compound and one or more isocyanate reactive compounds at least one of the isocyanate reactive compounds comprises an aromatic polyester polyol compound comprising an imide moiety wherein the aromatic polyester polyol is the reaction product of:
(i) a cyclic anhydride compound comprising Structure (1), Structure (2), or combinations thereof;

Structure (1)

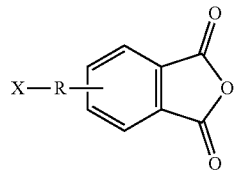

Structure (2)

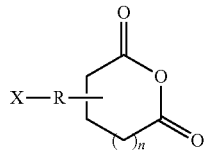

wherein X is a cyclic anhydride moiety, OH, or COOH, which is attached directly to the structure or through R which is an aromatic ring, aliphatic ring, aliphatic chain radical each containing from 1 through 12 carbon atoms with or without alkyl branches, and with or without hetero atoms comprising, O, N, and/or S and n is an integer from 0 through 1;
(ii) a phthalic acid based compound,
(iii) a primary amine compound,
(iv) an aliphatic diol compound;
(v) optionally, a high functionality, low molecular weight polyether polyol compound;
(vi) optionally, a hydrophobic compound; and
wherein the weight ratio of Component (i) to Component (ii) is from 1:24 to 24:1; and wherein the aromatic polyester polyol is liquid at 25° C. and comprises a hydroxy value ranging from about 30 to about 600.

7. The method according to claim 6, wherein the viscosity of the aromatic polyester polyol compound ranges from about 200 to about 150,000 centipoises at 25° C.

8. The method according to claim 6, wherein the acid value of the aromatic polyester polyol compound ranges from about 0.1 mg of KOH/g to about 10 mg of KOH/g.

9. The method according to claim 6, wherein the polyurethane foam composition does not comprise a solvent.

10. The polyurethane foam according to claim 6, wherein the polyurethane foam is applied to a surface of a roofing, wall, pipe, or storage tank assembly.

* * * * *